United States Patent [19]

Levine

[11] Patent Number: 4,635,708

[45] Date of Patent: Jan. 13, 1987

[54] ELECTRONIC THERMOSTAT FOR HEATING AND COOLING SYSTEM

[75] Inventor: Michael R. Levine, Ann Arbor, Mich.

[73] Assignee: Honeywell, Inc., Minneapolis, Minn.

[21] Appl. No.: 602,221

[22] Filed: Apr. 19, 1984

[51] Int. Cl.⁴ .............................................. F23N 5/20
[52] U.S. Cl. .................................... 165/12; 236/46 R
[58] Field of Search ................ 165/12, 26; 236/46 R; 364/557, 505; 62/158

[56] References Cited

U.S. PATENT DOCUMENTS

| | | | |
|---|---|---|---|
| 4,172,555 | 10/1979 | Levine | 236/46 R |
| 4,274,145 | 1/1981 | Hendricks et al. | 364/557 |
| 4,314,665 | 2/1982 | Levine | 236/46 R |
| 4,316,256 | 2/1982 | Hendricks et al. | 364/505 |
| 4,388,692 | 6/1983 | Jones et al. | 165/12 X |

*Primary Examiner*—William E. Wayner
*Attorney, Agent, or Firm*—Krass & Young

[57] ABSTRACT

A programmable electronic thermostat for use in a building having a furnace and an air conditioning system adapted to generate energizing signals for the furnace and the air conditioner. An operator programs the thermostat with a series of desired temperatures over a repetitive heating or cooling cycle. During the winter, relatively high temperatures will typically be programmed during the period when the building is occupied and relatively low temperatures during unoccupied periods. The thermostat includes a clock that interrogates the program to generate the desired temperature for the present time which is compared to the measured temperature within the building to generate control signals for the furnace. In order to energize the air conditioning system during occasional periods of occurrence of high temperature, a control temperature is derived for the air conditioner. The derived control temperature is either a first, relatively low control temperature if the heating program indicates that the building is generally occupied during that time, or a second, relatively higher control temperature if the program indicates that the building is unoccupied. If one of either the furnace or air conditioner has been energized within a predetermined time period, the control temperature is not changed and the other of the furnace or air conditioner will not be energized. Under complementary circumstances, if the thermostat is programmed to control the air conditioner, control temperatures to control the furnace are selected depending whether the building is generally occupied or unoccupied.

13 Claims, 5 Drawing Figures

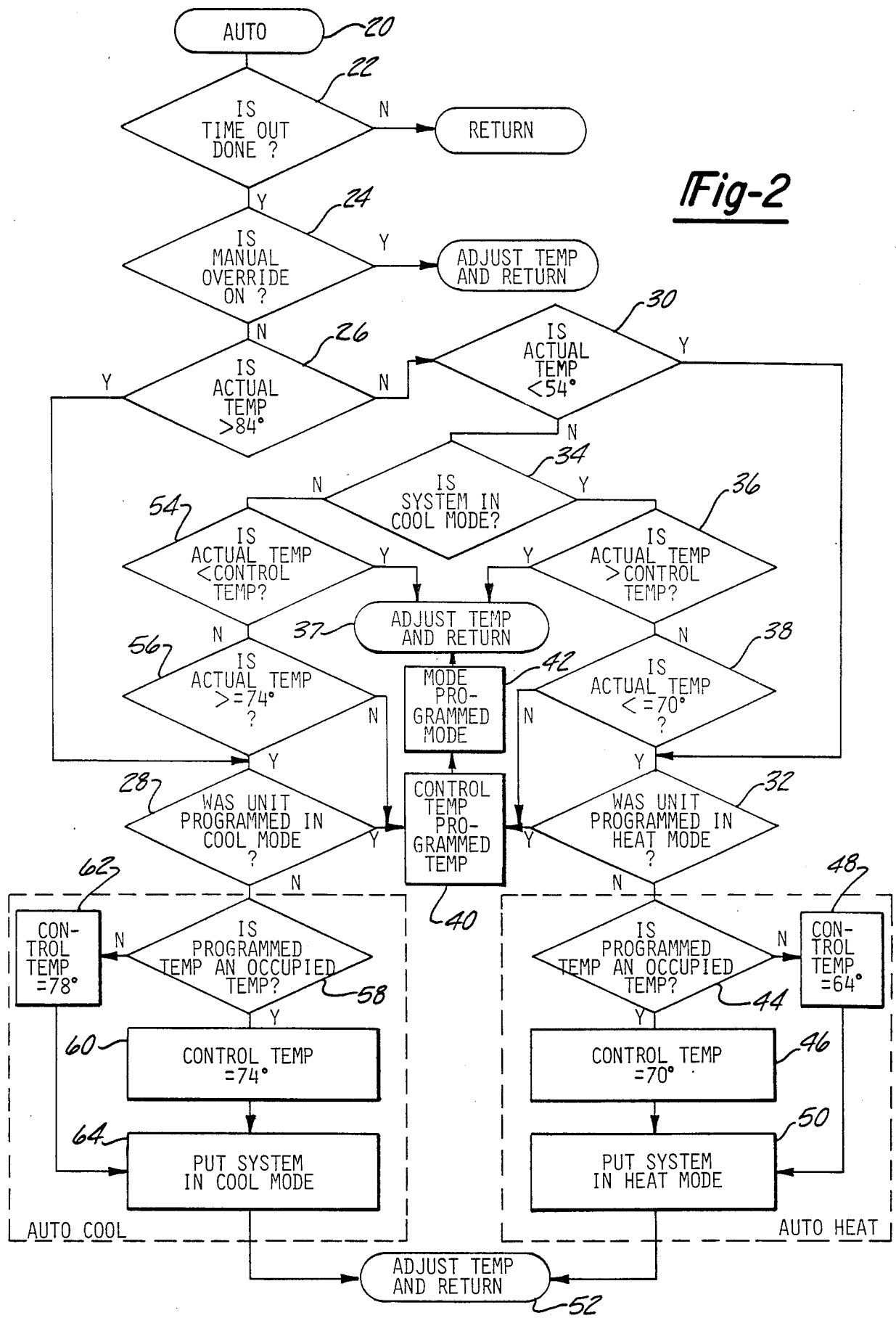

ELECTRONIC THERMOSTAT FOR HEATING AND COOLING SYSTEM

DESCRIPTION

TECHNICAL FIELD

This invention relates to thermostats for controlling both heating and air conditioning systems for the same enclosed area and, more particularly, to such thermostats including means for preventing rapid oscillation of the controlled temperature during periods of transition between low temperatures which require heating and high temperatures which require air conditioning.

BACKGROUND OF THE INVENTION

Many residences and commercial buildings in temperature climates have both heating and air conditioning systems. The heating systems are generally used during the winter and the air conditioning during the summer, but frequently during the spring and fall both systems are utilized during different periods of the day. Thermostats previously provided for these dual function systems typically included means for storing a first temperature set point for the heating system which may be manually adjusted to a level of say, 68 degrees, and separate means for storing a set point for the cooling system which may be adjusted to a higher temperature, such as 74 degrees. If the two set points are adjusted too close to one another the system may oscillate between heating and cooling modes because the temperature may overshoot the heating set point during the heating mode and undershoot the cooling set point during the cooling mode. This undesirable oscillation may also occur as a result of thermal exchange between adjacent zones in a multi-zone heating system. If the set points are set too widely apart, to minimize the possibility of oscillation, the comfort of the occupants, who would prefer a single constant temperature, is diminished.

These problems are exacerbated when multitemperature programmable thermostats of the type disclosed in the U.S. Pat. No. 4,172,555 are employed since the maximum temperatures that may be programmed during a heating cycle must be limited to avoid unintentional energization of the cooling system and vice-versa.

SUMMARY OF THE INVENTION

The present invention is directed toward a thermostat system for controlling both heating and cooling systems for the same area which allows relatively closely spaced heating and cooling set points without danger of oscillation.

A preferred embodiment of the invention, which will subsequently be disclosed in detail, includes a programmable memory for storing a single schedule of desired temperatures over repetitive time cycles such as one week. The thermostat includes a three position switch for placing the thermostat into any one of a heating mode, a cooling mode, or an automatic mode. Whether the stored schedule is used as a heating schedule or a cooling schedule depends upon the position of the mode switch during the programming of the memory. If the mode switch is in automatic or heating mode during programming, the program is viewed as a heating cycle. Otherwise, the program is viewed as a cooling cycle. The thermostat includes a clock that interrogates the memory causing it to output a signal representing the desired temperature at the time of interrogation. This signal is compared to a signal representing the measured temperature within the building to generate an on/off control signal for the furnace.

If the thermostat is programmed, for example, while in the heating mode, the thermostat acts on the stored program as a heating schedule as long as the mode switch remains in the heating position. In this state, the thermostat will generate energizing signals exclusively for furnace to raise the ambient temperature toward the programed temperature. If the switch is moved to the automatic mode, the thermostat will continue to operate to energize the furnace until the ambient temperature exceeds both the temperature stored in the program and a predetermined maximum temperature. When the ambient temperature exceeds this predetermined level, the thermostat will automatically energize the air conditioning unit, along with any associated blower fan, to maintain the temperature at or about the predetermined maximum temperature. If the ambient temperature thereafter falls and remains below the maximum temperature, the thermostat returns to its normal operating state wherein the furnace is energized to maintain the desired temperature. To prevent oscillation of the system between heating and cooling, a time delay is incorporated which prevents the energization of the air conditioner and blower fan if the furnace has been energized within a pre-determined time, e.g., one half hour, and vice-versa.

When the cooling season begins, the unit may be reprogrammed with a cooling cycle by placing the mode switch in the cooling mode and reprogramming the thermostat. When the mode switch is then returned to automatic, the system will follow the programmed cooling cycle unless the ambient temperature drops below the desired cooling temperature and below a predetermined minimum temperature. If this occurs, the furnace will be energized to raise the temperature, subject to the time delay described above.

In an alternative embodiment of the invention, the energization of the furnace and air conditioner when the thermostat is in the automatic mode is determined relative to the set point value stored for the particular time without regard to predetermined maximum or minimum temperatures. In this embodiment, the ambient temperature is maintained at or about the set point value at all times during the day.

In still another embodiment of the invention, the unit may be programmed with both a full heating time/temperature program and a full cooling time/temperature program. In the heat or cool mode, the appropriate time/temperature problem will be operative. In the auto mode, only one of the programs will be operative at any given time and will control either the heating or the cooling in a normal manner. For example, when the unit is using the heating schedule, if the ambient temperature exceeds the cooling set point stored for that period and the furnace has not been energized for a predetermined period of time, the unit will switch over to the cooling schedule. A switch in the reverse direction will occur under complementary conditions.

Other objectives, advantages and applications of this invention will be made apparent by the following detailed description of the preferred embodiment of the invention. This description makes reference to accompanying drawings in which:

BRIEF DESCRIPTION OF THE DRAWINGS

FIG. 2 is a block diagram illustrating a preferred embodiment of the automatic heat/cool sequence for the thermostat of the present invention.

DETAILED DESCRIPTION OF THE INVENTION

The thermostat of the present invention provides for automatic switching between heating and cooling modes of operation so that a comfortable temperature is maintained inside a building at all times. In a preferred embodiment of the thermostat, a single heating or cooling schedule is programmed into the thermostat using any conventional means. For example, the thermostat may be programmed as described in my U.S. Pat. No. 4,172,555. Using the programming procedure described in that patent, the primary operating mode of the thermostat is first selected. For example, if the unit is programmed during the winter, the heating mode is the primary mode of operation for the thermostat. The thermostat is placed in the heating mode, for example, by moving a switch.

After the operating mode is selected, desired temperatures are programmed into the thermostat. The operator enters temperature set points for various times during the day. Once the thermostat has been programmed for a repetitive cycle, e.g., one week, it can then be used to heat the house according to the programmed schedule.

Figure 1:
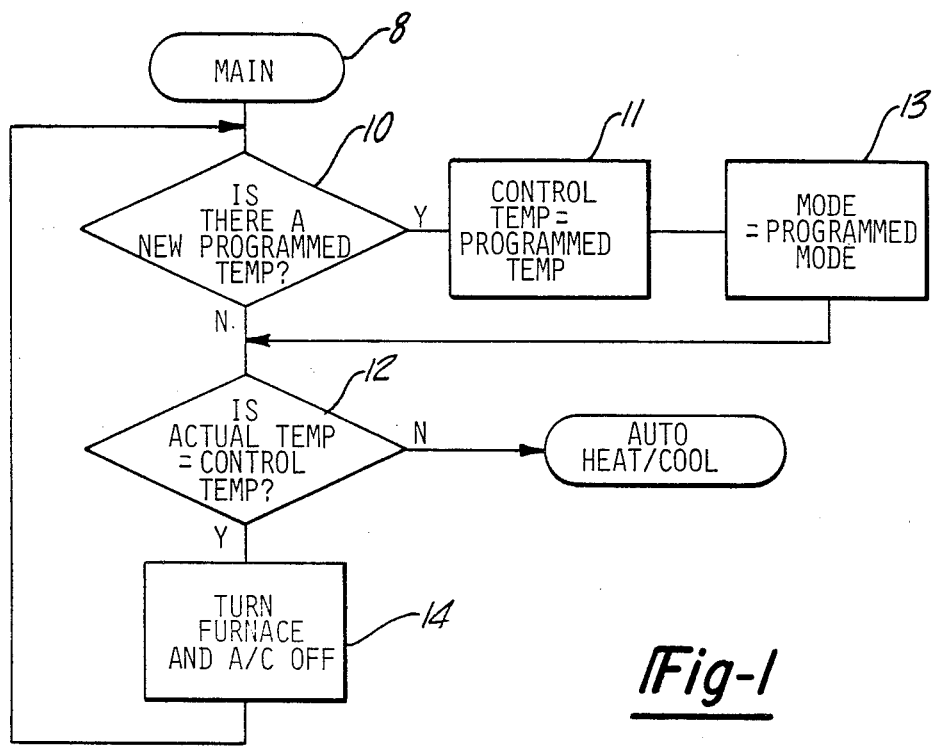
FIG. 1 is a block diagram illustrating the operation of the main control routine of the thermostat control of the present invention.

FIG. 1 illustrates the basic operation of the thermostat after the programming sequence has been accomplished. The operation of the thermostat may be implemented in hardware or, preferably, by a microprocessor under program control. If the thermostat remains in the operating mode in which it was programmed, e.g., heating mode, it will activate the furnace (or air conditioner) exclusively to maintain the ambient temeprature at or about the programmed set point. Thus, if the thermostat remains in heating mode, the air conditioner will not be energized even when the ambient temperature rises above the set point temperature.

Automatic control of the system is effected by placing the thermostat in automatic mode. When the thermostat is placed in automatic mode, the temperature control sequence begins at step 8. The set points stored in the time/temperature program are read out of the memory by a real time clock (not shown) at step 10 to determine whether the temperature has been programmed to change at the present time. If so, a control temperature value is set equal to the programmed temperature at step 11 and the operating mode is set to the mode in which the thermostat was programmed, at step 13. After these values have been set, or if the programmed temperature did not change at step 10, control passes to step 12. At step 12, the actual temperature in the building is compared with the control temperature which was set either in step 11, as described above, or by the auto heat/cool sequence which is described in detail below. If the actual temperature is at the control temperature, the thermostat turns off the furnace and air conditioner at step 14 and returns to the beginning of the program, step 10. If, however, the actual temperature is higher or lower than the desired temperature, the thermostat performs the auto heat/cool sequence described in detail below. When the auto heat/cool sequence has been completed, the thermostat control program returns to step 10 and continues its usual sequence described above.

Referring now to FIG. 2, a preferred embodiment of the auto heat/cool sequence is illustrated beginning at step 20. At step 22 the system checks whether a sufficient amount of time, preferably a half hour, has elapsed since the heat/cool sequence was last executed. This time delay prevents the thermostat system from rapidly switching between heating and cooling modes when the ambient temperature falls slightly below or rises slightly above the control temperature. If sufficient time has not passed at step 22, control will return to step 10 in FIG. 1. If sufficient time has elapsed since the last execution of the heat/cool sequence, the auto heat/cool sequence continues at step 24. Step 24 checks whether the manual override has been activated by the operator of the thermostat. The manual override may consist, for example, of a switch on the thermostat which may be set to permit manual control of the temperature in the building. If the manual override is on, the auto heat/cool sequence will not be invoked. Instead, the temperature is adjusted, as described below with reference to FIG. 3, and control returns to step 10 in FIG. 1.

If the manual override is not on at step 24, control passes to step 26 where the system checks whether the actual temperature is above an absolute maximum. The purpose of the check in this step is to ensure that the temperature in the building does not rise to a dangerously hot level. This safeguard is not required for proper operation of the system, but is included in the preferred embodiments. In the preferred embodiments of the invention, the absolute maximum is set at 84° F. If the actual temperature is above 84° F., the control passes to step 28 and a cooling mode of operation begins, as will be described below.

If the actual temperature is below the absolute maximum value, control passes to step 30 where the actual temperature is compared to an absolute minimum temperature. As with the absolute maximum temperature, the actual temperature is check against the absolute minimum temperature in order to ensure that the temperature of the building does not become dangerously low. Again, this check is not required for proper operation of the system but is included in the preferred embodiments for safety. In the preferred embodiments, the absolute minimum temperature is set at 54° F. If the actual is below the absolute minimum temperature, control passes to step 32 where the thermostat is forced into a heating mode. If the temperature in the building is above the absolute minimum temperature, control is passed to step 34 where the normal auto heat/cool sequence begins.

At step 34, the system checks whether the system is presently in the cooling mode, i.e., whether the present operating mode, set either in step 13 (FIG. 1) or during the auto heat/cool sequence, is the cooling mode. If the operating mode is the cooling mode, control passes to step 36 where the actual temperature is compared to the control temperature. The control temperature is normally the temperature that was programmed by the operator during the initial programming operation. However, as described below, the control temperature is sometimes a temperature set during the auto heat/cool sequence. The control temperature is used to control the operation of the furance and air conditioning unit so that the proper temperature level is achieved.

If the actual temperature is greater than the control temperature, the air conditioner must be activated. Since the system is already in the cooling mode, as determined in step 34, the system merely branches to the adjust temperature routine at step 37, and returns to the main routine. The operation of the temperature adjustment sequence is described below with reference to FIG. 3.

If, however, the actual temperature in the building is less than the control temperature, at step 36, energizing the air conditioning unit will simply lower the actual temperature further. Thus, the system must determine whether to switch from cooling mode to heating mode and begin raising the ambient temperature using the furnace. In the preferred embodiment of FIG. 2, the switch from a programmed cooling mode to an automatic heating mode is made only if the ambient temperature is less than or equal to a predetermined minimum temperature. In step 38, then, when the actual temperature is less than the control temperature, the actual temperature is compared to the predetermined minimum temperature which may be set, for example, at 70°. If the actual temperature is above this minimum, the auto heat sequence is not invoked. Instead, the control temperature and operating mode simply remain at their original programmed values in steps 40 and 42, or, if the control temperature and operating mode were changed, are reset back to their original values. Control then passes, through the adjust temperature sequence, back to the main routine.

On the other hand, when the actual temperature is below the predetermined minimum temperature, the system must switch from cooling to heating mode. If the unit was originally programmed in heating mode, step 32, the original programmed values are simply restored for both control temperature and operating in steps 40 and 42. In this manner, the system reverts to heating mode, the progrmmed mode, and the furnace may be energized in the adjust temperature routine described below.

If the unit was not programmed in the heating mode, the system must automatically switch from cooling to heating modes. One difficulty encountered in making this switch is that, in the embodiment disclosed in FIG. 2, only a single set of temperature values are stored. Consequently, the system cannot simply look-up the proper heating temperature. Instead, it must derive the temperature based on the original temperature programmed by the user. In the embodiment illustrated in FIG. 2, the heating temperature is derived by dividing the cooling temperatures into two temperature ranges. The first range is called the "occupied" temperature range and comprises cooling temperatures which the user would choose if the building was occupied, for example, cooling temperatures in the range of 62° to 74°. Similarly, the second range of temperatures is called the "unoccupied" temperature range and comprises temperatures greater than the occupied temperatures, e.g. 76° and above. Thus, if the thermostat was programmed in the cooling mode for temperatures within the first range, the system assumes that the heating temperature should be set at a relatively warm temperature to maintain the comfort of the occupants. On the other hand, if the thermostat was programmed at a temperature in the second range, the system will control the heating temperature at a lower value to conserve energy.

Thus, in step 44, if the programmed temperature is in the first, occupied temperature range, control passes to step 46 where the control temperature, i.e. the temperature used to control the operation of the furnace or air conditioner, is set to 70 degrees. If, however, the programmed temperature is within the second, unoccupied range of values, the control temperature is set at 64 degrees in step 48. After the control temperature has been set, the system is placed in the heating mode at step 50 and the ambient temperature is adjusted, step 52. Control then passes to step 10 in FIG. 1.

A similar sequence of steps is followed when the present operating mode of the system is the heating mode. In that case, at step 34, control passes to step 54 where the actual temperature is compared to the control temperature. As decided above, the control temperature is either the temperature programmed in by the user of the thermostat or it is the temperature selected by the auto heat/cool sequence. If the actual temperature is less than or equal to the control temperature, the furnace is activated at step 38 and the temperature is adjusted toward the control temperature. The operating sequence then continues at step 10 in FIG. 1.

If, however, the actual temperature is greater than the control temperature, step 54, the actual temperature is compared to a predetermined maximum temperature at step 56. As with the predetermined minimum temperature described above, the predetermined maximum temperature allows the system to decide whether it should switch from the present heating mode to a cooling mode. In the preferred embodiment illustrated in FIG. 2, the switch will occur only when the ambient temperature is at or above the predetermined maximum temperature, 74° in the illustrated embodiment. If the ambient temperature is below 74° in step 56, the system simply resets the control temperature and the operating mode to their original programmed values, in steps 40 and 42, and returns to the main routine, in step 37, via the adjust temperature sequence.

When the temperature in the building is at or above 74° in step 56, the system has determined that the building is too warm and the air conditioning unit should be activated. Therefore, at step 28, if the thermostat was originally programmed in the cooling mode, the system need only restore the original control temperature and operating mode values to their programmed values at steps 40 and 42. The air conditioner is then activated in the adjust temperature routine, described below, and control returns to step 10 in FIG. 1.

If the thermostat was not initially programmed in the cooling mode, step 28, the system will be forced into the automatic cooling mode of operation and will select an appropriate cooling temperature depending upon whether the programmed temperature is in an occupied temperature range or in an unoccupied temperature range. Thus, if the thermostat was programmed in heating mode at a temperature in an occupied temperature range, e.g. 66° to 78°, the system branches from step 58 to step 60 where the control temperature is set to a relatively cool temperature, e.g. 74°. If, on the other hand, the programmed temperature is in an unoccupied temperature range, e.g. below 66°, the control temperature for air conditioning operation is set at a higher value in step 62. This permits energy savings when the building is unoccupied. After the control temperature has been set to the appropriate temperature in either step 60 or step 62, the system is placed in the cooling mode, step 64, and the air conditioner is activated by the adjust temperature routine at step 52. Control is then returned to the main routine in FIG. 1.

Figure 3:
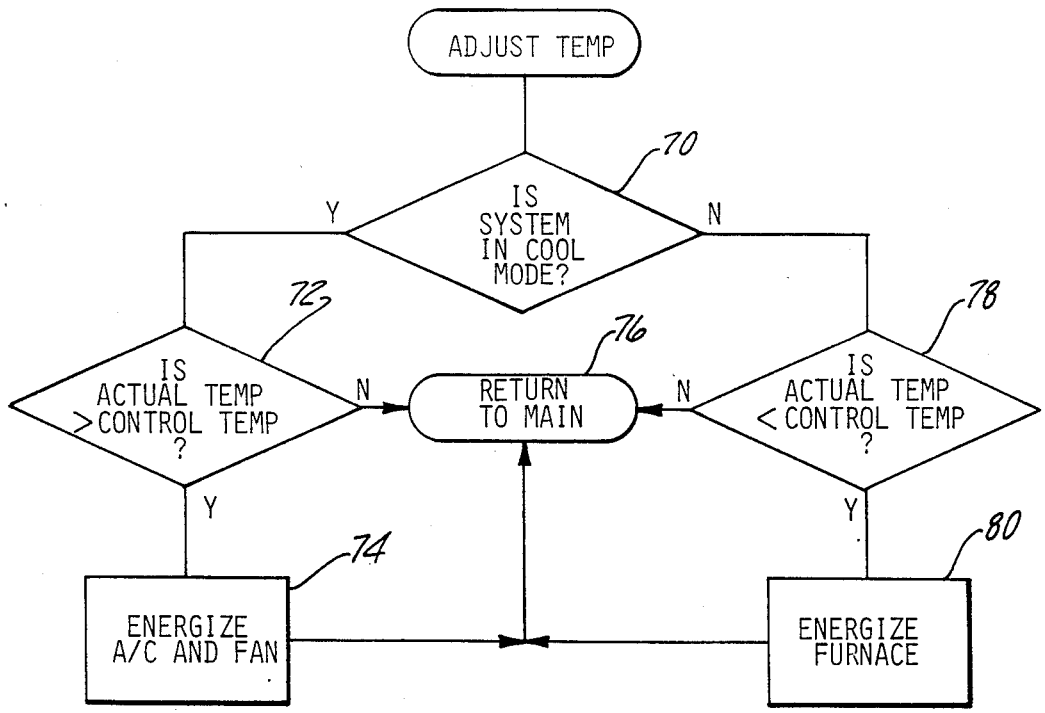
FIG. 3 is a block diagram illustrating the temperature adjustment sequence of the thermostat of the present invention.

Turning now to FIG. 3, the thermostat, after selecting the appropriate control temperature and operating mode, performs the adjust temperature routine. The routine begins at step 70 by determining whether the system is to operate in heating or cooling mode. If the operating mode is cooling, the actual temperature is compared to the control temperature in step 72. When the actual temperature is above the control temperature, the air conditioner and fan must be activated to lower the ambient temperature, step 74. Once the air conditioner and fan are activated in step 74, or if the acutal temperature is not above the control temperature in step 72, control is passed back to the main routine (FIG. 1) at step 76.

When heating mode is selected by the automatic heat/cool sequence, the adjust temperature routine branches from step 70 to step 78. From step 78, the system branches to step 80, to energize the furnace, when the actual temperature is below the control temperature. Control then returns to the main routine (FIG. 1) at step 76.

The thermostat will operate as described above unless the user places the thermostat in the manual override mode or reprograms the thermostat in the cooling mode. If the user reprograms the thermostat, the thermostat will use the new mode of operation as its primary (programmed) mode. If manual override is selected, the temperatures entered by the user will be used and the auto heat/cool sequence will not be performed.

Figure 4:
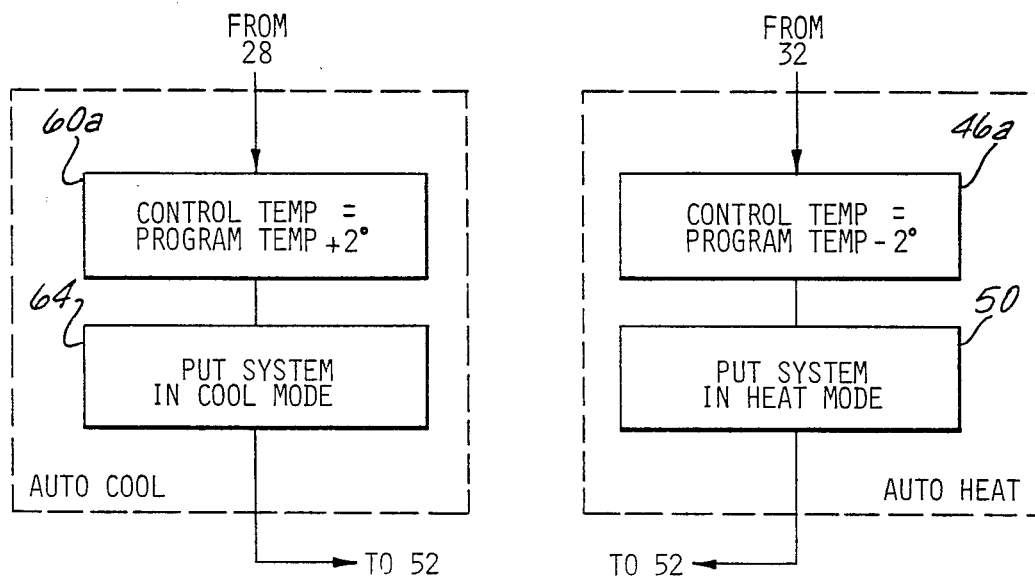
FIG. 4 is a block diagram illustrating the auto cool and auto heat modes of a second embodiment of the present invention.

In an alternative embodiment of the invention, when the thermostat switches automatically from heating to cooling or vice versa, the control temperature is set to a temperature relative to the programmed temperature rather than at a predetermined fixed value. For example, the system might add 2° to the current programmed heating temperature when choosing a control temperature in auto cool mode. This would be accomplished, as shown in FIG. 4, by replacing steps 58, 60 and 62 with a single step 60a which simply sets the control temperature to the programmed temperature plus 2°. Likewise, when changing from a programmed cooling mode to an automatic heating mode, the control temperature would be set 2° less than the programmed temperature, step 46a replacing steps 44, 46 and 48.

In this alternative embodiment, the automatically selected control temperature may even be set equal to the programmed temperature. The system would thus maintain the building temperature at the desired temperature throughout the day. The system avoids the problem of rapid oscillation between the heating and cooling modes because time inhibition is built into the system using the time-out check in step 22. Thus, in the thermostat of the present invention, the heating temperature and cooling temperature may be set to the same value without encountering unwanted oscillation of the system between heating and cooling modes.

Figure 5:
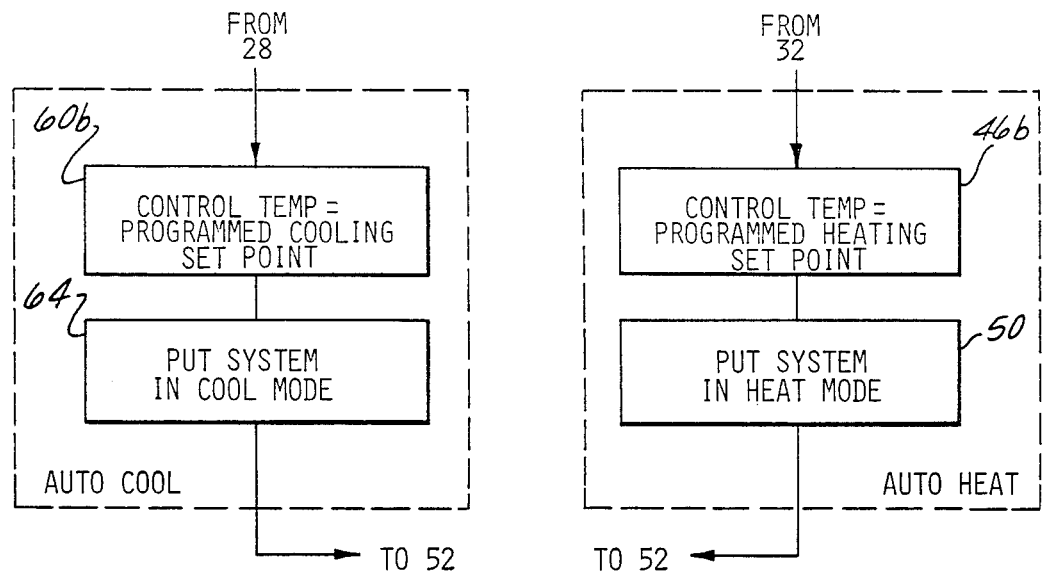
FIG. 5 is a block diagram illustrating the auto cool and auto heat modes of a third embodiment of the present invention.

In a third embodiment of the invention the thermostat may store both a heating schedule and a cooling schedule such that, when the system enters the auto cool or auto heat portion of the sequence, the system derives its control temperature from a cooling or heating schedule which has been preprogrammed by the user. In this manner, the user has complete control over the heating and cooling temperatures in the building. The selection of the control temperature during an auto cool cycle may be accomplished, as shown in FIG. 5, by replacing steps 58, 60 and 62 with a single step 60b which sets the control temperature equal to the preprogrammed cooling temperature set point. A similar replacement, step 46b, is made for steps 44, 46 and 48 in the auto heat cycle.

It can thus be seen that an electronic thermostat is presented which provides for automatic heating and cooling of a building while avoiding unwanted oscillation of the temperature control system between heating and cooling modes of operation. It is understood that various modifications to the system described and illustrated above may be made by those skilled in the art without departing from the spirit and scope of invention expressed in the following claims.

I claim:

1. A thermostat for use in a building having means for heating and means for cooling the building, the thermostat being connected to the heating means and the cooling means to selectively control the state of operation of each, the thermostat comprising:
   memory means for storing at least one set of time/temperature values representing desired temperature levels at predetermined times;
   a clock;
   means under control of the clock for outputting a temperature value representing the present desired temperature from the memory means;
   means for selecting a control temperature as a function of the present desired temperature;
   sensor means for measuring the ambient temperature in the building;
   means for comparing the ambient temperature to the control temperature;
   means for generating a signal to energize one of said heating means or said cooling means when the ambient temperature is not substantially equal to the control temperature;
   timer means adapted to receive the last said signal and to trigger a predetermined time delay; and
   means for inhibiting the energization of the said other of said heating means or said cooling means during the time delay period.

2. The thermostat of claim 1 including manually actuable means for placing the thermostat in a first mode wherein the thermostat generates signals to energize only said heating means, a second mode where the thermostat generates signals to energize only said cooling means, or a third mode wherein the thermostat generates signals to selectively energize either said heating means or said cooling means.

3. The thermostat of claim 2 wherein, when the thermostat is programmed in the first mode and placed in the third mode, the selected control temperature is equal to the present desired temperature when the ambient temperature is not above both the desired temperature and a predetermined maximum temperature; and the selected control temperature is equal to a predetermined cooling temperature when the ambient temperature is above both the desired temperature and the predetermined maximum temperature.

4. The thermostat of claim 3 wherein the predetermined cooling temperature is a first value when a present desired temperature is in a first temperature range and a second, higher value when the present desired temperature is in a second, lower range.

5. The thermostat of claim 3 wherein the predetermined cooling temperature is set at a predetermined number of degrees above the present desired temperature.

6. The thermostat of claim 3 wherein the predetermined cooling temperature is equal to the present desired temperature.

7. The thermostat of claim 2 wherein, when the thermostat is programmed in the second mode and placed in the third mode, the selected control temperature is equal to the present desired temperature when the ambient temperature is not below both the desired temperature and a predetermined minimum temperature; and the selected control temperature is equal to a predetermined heating temperature when the ambient is below both the desired temperature and the predetermined minimum temperature.

8. The thermostat of claim 7 wherein the predetermined heating temperature is a first value when the present desired temperature is in a first temperature range and a second, lower value when the present desired temperature is in a second, higher temperature range.

9. The thermostat of claim 7 wherein the predetermined heating temperature is set at a predetermined number of degrees below the present desired temperature.

10. The thermostat of claim 7 wherein the predetermined heating temperature is equal to the present desired temperature.

11. The thermostat of claim 1 including means for storing a first program of desired temperatures over a repetitive time cycle for a heating mode and a second program of desired temperatures over the same repetitive time cycle for a cooling mode.

12. The thermostat of claim 11 including manually actuable means for placing said thermostat in a first mode wherein the thermostat can only generate energizing signals for means for heating the building as a function of the ambient temperature and the temperature stored in said heating program, a second mode wherein said thermostat can only generate control signals for said means for cooling the building as a function of the ambient temperature and temperature stored within said cooling mode program, or a third mode wherein said thermostat can generate energizing signals for either said cooling means or said heating means as a function of the ambient temperature and the temperatures stored within said heating program and said cooling program.

13. The thermostat of claim 1 wherein said thermostat includes a programmable microcomputer having read only memory storing a program for said microcomputer.

* * * * *